2,870,140

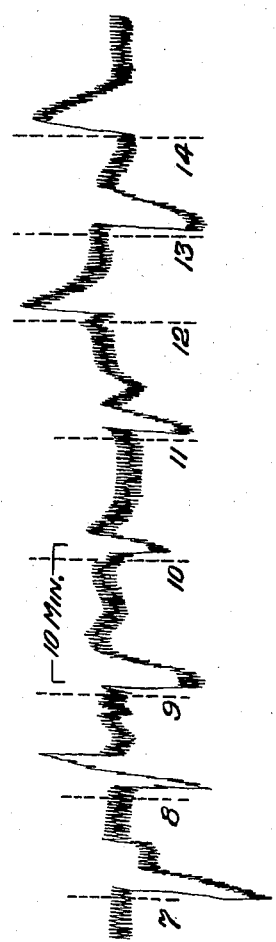

THERAPEUTIC AGENTS DERIVED FROM RAUWOLFIA SERPENTINA

Marvin R. Thompson and Robert E. Thompson, Fairfield County, Conn.

Application July 21, 1953, Serial No. 369,352

8 Claims. (Cl. 260—236.5)

This invention relates to a hitherto unknown therapeutic principle obtained from *Rauwolfia serpentina* and related species. This principle has been named "Rausedin" by the discovers.

The therapeutic principle (Rausedin) herein disclosed is particularly adapted for the treatment of psychological, anxiety and tension states such as associated with hypertension, insomnia, anorexia, gastroenteritidies and numerous other human diseases, especially those with psychosomatic mechanisms.

The therapeutic action of Rausedin may be described as "calming" or "sedative-like" but differs from commonly used sedatives in that there is much less, if any, effect in depressing higher mental functions. In fact, even high doses, sufficient to cause death in experimental animals such as rabbits and mice, in about twelve to forty-eight hours, fail to produce a state of unconsciousness which is easily produced by sublethal doses of other sedatives such as barbituric acid derivatives, chloral hydrate and the like.

The action of Rausedin differs from other known preparations of or from *Rauwolfiia serpentina* and related species in that it is substantially free from the acutely acting conculsive vasodepressor and exciting principles derived from the crude drug in the so-called "alkaloidal" fraction by extractions with solvents such as alcohol (see Nelson and Schlagel, J. A. PhA., vol. XLII, No. 5, May 1953, pp. 324). We do, in fact, use such extraction procedures in one embodiment of the present invention to extract and remove the "alkaloidal" fraction from Rausedin so that Rausedin can be used for its specific therapeutic indications without the acute and opposing actions of this so-called "alkaloidal substance," which we call "Rauwoxin."

Obviously, before the present discovery, the crude drug *Rauwolfia serpentina* and related species could not be used reliably even when the mixture of opposingly active principles were tolerable because there was no way of determining the quantities of each in a given lot of drug.

It is one of the objects of the present invention to provide a means of measuring the quantity of Rauwoxin and of Rausedin in a given lot of *Rauwolfia serpentina* and then to adjust the amount of each to an amount uniform from lot to lot and of a correct ratio for treatment of hypertension and similar conditions where it may be desirable to administer simultaneously the hypotensive Rauwoxin and Rausedin.

The ratio present in the crude drug is not proper for treatment of hypertension because the relatively high content of Rausedin and its prolonged action leads to cumulative effect and side reactions if sufficient of the crude drug or its equivalent is given to obtain and maintain the hypotensive effect of the Rauwoxin component.

It is one of the objects of our invention to obtain from the same lot of crude drug both Rausedin and Rauwoxin each substantially free of the other.

Another object of our invention is to prepare and provide Rausedin substantially free of other active constituents in the most economical way possible. Likewise, it is an object to prepare and provide Rauwoxin substantially free from Rausedin in the most economical way.

Other and additional objects and advantages of our invention will become obvious as the disclosure proceeds.

Our invention is illustrated in several embodiments by the accompanying examples and pharmacologic tests.

Example I 300 grams of comminuted *Rauwolfia serpentina* was taken. This was moistened with 300 ml. of methanol. It was packed into a conventional percolator and then methanol was added until liquid extract exuded from the lower orifice. The lower orifice was then closed; the methanol covered drug was allowed to stand at room temperature for sixteen hours. The lower orifice was then opened sufficiently to allow the liquid extract to exude at a very slow rate. 3000 ml. of extract were collected over a period of six days. A layer of methanol was always maintained above the drug during percolation.

The liquid extract was evaporated to dryness at 25° to 40° C., 300 ml. of water was added, mixed well and allowed to stand over night at room temperature, and then filtered. Each ml. of filtrate then contained the Rauwoxin derived from one gram of drug. This filtrate was tested on mice by intraperitoneal injection. Doses corresponding to 8, 4, 2 and 1 ml. per kg. of mouse were administered each to groups of four mice. All mice receiving 8 ml. per kg. died within ten minutes with excitement, convulsions, twitchings, etc. Three of the four mice receiving 4 ml./kg. died in seventeen minutes with convulsions, excitement, etc. The remaining mouse in this group had convulsions and quivering but no "sedation" and survived in apparently normal health after the first hour.

The mice receiving 2 and 1 ml. per kg. exhibited excitement symptoms for about an hour, no "sedative" effect and survived in apparently normal health.

The above symptoms, short duration of effect, dosage and lack of "sedative" effect is characteristic of Rauwoxin substantially free of Rausedin.

That the above alkaloidal fraction is substantially free of Rausedin is further proven by the subsequent extraction of Rausedin from the methanol exhausted marc from Example I. This is described in Example II.

Example II

The methanol exhausted marc from Example I was mixed 20 grams with 200 ml. of water and allowed to macerate with occasional agitation for about forty-eight hours. It was then filtered. The filtrate was administered intraperitoneally to mice in doses of 40 ml. per kg. of mouse and 10 ml. per kg. of mouse corresponding to doses of Rausedin derived from 4.0 and 1.0 gm. methanol extracted marc respectively.

In neither group was any convulsive or excitement phase present. "Sedative-like" symptoms gradually developed so there was definite sedation at five hours after injection, much heavier sedation to actual stupifaction and failure to right themselves on stimulation at nine hours. In twenty-six hours all mice on the higher dose were dead. Two out of three of the mice on the lower dose were dead.

The Rausedin content of the methanol extracted marc was thereby shown to be approximately equal to the drug before extraction with methanol. (See Example III.)

Example III

The 20 grams of comminuted *Rauwolfia serpentina* was added 200 ml. of water. The mixture was allowed to macerate for about forty-eight hours with occasional agitation at room temperature. It was then filtered to obtain a clear filtrate, each ml. derived from 0.1 gm. of crude drug.

Mice (5 per group) were injected intraperitoneally with doses corresponding to 10.0 ml. and 5.0 ml. of the filtrate per kg. of mouse. Definite "sedative-like" symptoms developed during three hours after injection. At eleven hours symptoms were stronger in the group of mice receiving the larger dose and moderate in the lower dose group. At eighteen hours one mouse in each group was dead, with others showing moderate to heavy symptoms. At thirty-two hours three more mice on the higher dose and two more on the lower dose had died, making the total thirty-two hours mortality ⅘ and ⅗ respectively. No significant acute (within two hours) or excitement symptoms were observed.

The symptomatology and duration of action here are in sharp contrast to the alcohol extractable Rauwoxin (Example I). This is because of the relatively high amount of Rausedin extracted with water. Effective doses of the extract then contained insufficient of the more acutely acting Rauwoxin to produce a significant effect while containing sufficient Rausedin to actually produce heavy sedation and death of the animals in a thirty-two hour period.

*Example IV.*

To 7.0 ml. of the aqueous filtrate from Example III was added 35 ml. methanol. On standing a copious, flocculent precipitate separated and settled to the bottom of the containing vessel. The precipitate was Rausedin in substantially pure form, obviously separated from the acutely acting Rauwoxin, since methanol was used for the precipitation of Rausedin, and it was previously demonstrated that Rauwoxin is soluble in methanol.

That the precipitate was Rausedin was shown by washing the precipitate with another 30 ml. portion of methanol, drying, dissolving the precipitate in water and then testing by intraperitoneal injection into mice. The precipitate was taken up in 3.0 ml. saline and injected 1.0 ml. per 30 gr. mouse. Sedative-like symptoms developed gradually, noticeable in about two hours, maximal at about eighteen to twenty-four hours. There was no evidence of acute convulsive or excitement symptoms.

*Example V*

To 7.0 ml. of the aqueous filtrate from Example III was added thirty-five ml. of acetone. A fine white precipitate separated. On standing at about 6° C. for two hours the precipitate collected on the bottom and sides of the containing vessel. The liquid was decanted off and precipitate allowed to dry at room temperature. Upon examination the dried precipitate was found to be crystalline.

The precipitate was dissolved in 3.0 ml. of saline and injected 1.0 ml. per mouse intraperitoneally. Symptoms typical of Rausedin developed over a period of hours. All mice (three) were dead at the end of twenty-four hours. There was no evidence of acute convulsive or excitement symptoms during this test. The yield of Rausedin was higher, as evidenced by stronger effect in mice, when precipitated with acetone than when precipitated with methanol under the conditions of Example IV.

*Example VI*

Twenty grams of comminuted *Rauwolfia serpentina* was mixed with 200 ml. of water and macerated with occasional agitation at room temperature for about 48 hours and then filtered. 50 ml. of the filtrate (corresponding to 5000 mgm. crude drug) was dried with the aid of gentle heat (40 to 50° C.). 300 mgm. of Rausedin containing solids were obtained. The biologically active material was predominantly Rausedin as evidenced by tests on mice. A dose of 25 mgm. per kg. killed mice without evidence of convulsive, excitement or acute (within two hours) symptoms. Only "sedative-like" symptoms typical of Rausedin developed.

*Example VII*

20 grams of comminuted *Rauwolfia serpentina* was macerated with 200 ml. of 10% methanol in water with occasional agitation for 72 hours and then filtered. Biological assay of the filtrate indicated a high yield of Rausedin, equivalent to or somewhat higher than plain aqueous extracts under similar conditions, probably because of the preservative, fermentation-inhibiting action of the alcohol in concentration below that required to significantly inhibit solubility of the Rausedin.

*Example VIII*

20 grams of comminuted *Rauwolfia serpentina* was macerated with 200 ml. of water containing 0.1% methyl paraben for 72 hours with occasional agitation and then filtered. Biological tests indicated a higher yield of Rausedin perhaps as a result of inhibition of fermentation by the methyl paraben and the longer maceration period thereby made possible.

*Example IX*

20 grams of comminuted *Rauwolfia serpentina* was macerated with 200 ml. of 50 percent methanol in water with occasional agitation for about 72 hours and then filtered. The filtrate was evaporated to one-seventh of its original volume to remove alcohol and then diluted with saline to one-half its original volume for biological assay. Doses corresponding to 4.0 and 2.0 grams of the crude drug (per kg.) were administered to mice intraperitoneally. Two of the four mice on the higher dose died within 45 minutes with excitement and convulsions typical of Rauwoxin. Slight if any sedative-like symptoms typical of Rausedin developed during 24 hours in the survivors. This shows less than 25% of the Rausedin content of extracts prepared with lower alcohol (10%) or non-alcoholic menstrua. It shows a full yield of the acutely acting Rauwoxin.

*Example X*

200 grams of *Rauwolfia serpentina* was macerated with 2000 ml. of 10% methanol with occasional agitation at room temperature for 48 hours and then filtered. 1500 ml. of the filtrate was alkalized with ammonia water to pH 8.5 to 10.0 and shaken out with six 500 ml. portions of ether in a separatory funnel. The ether solution was separated and then evaporated to dryness yielding 460 mgm. of residue.

The ether extracted aqueous portion was acidified to pH 4.0 to 5.0 with tartaric acid and evaporated to dryness. About 6.0 grams of solids was obtained.

An acidified aqueous solution of the ether residue (Rauwoxin) killed mice at a dose of 50 to 100 mgm. per kg. with acute symptoms typical of Rauwoxin. Some residual long acting effect showed the presence of traces of Rausedin.

An aqueous solution of the solids obtained from the ether extracted, aqueous solution above was injected into mice and showed symptoms typical of Rausedin and a Rausedin potency about 10 times that of the ether residue fraction in terms of crude drug equivalent. In other words about 90% of the Rausedin was retained in the aqueous solution after exhaustive extraction with ether. This demonstrates the fact that the alkaloidal components were removed and separted from the drug.

*Example XI*

50 ml. of aqueous solution of Rauwoxin prepared as in Example I, which by assay contained one Rauwoxin unit (2 hr. L. D. 50 in dose per kg. mouse with no 24 hour Rausedin effect) in 4.0 ml. was mixed with 50 ml. of aqueous solution of Rausedin (prepared as in Example V) which contained one Rauwoxin unit (48 hr. L. D. 50 in dose per kg. mouse with typical Rausedin symptoms and no alkaloid symptoms nor deaths in 2 hrs.).

This mixed solution was dried to obtain the dry solid product suitable for preparing capsules, tablets and the like. A portion of the solids was dissolved in water and administered to mice in a dose corresponding to ¼ of each of the units above. Symptoms characteristic of Rauwoxin were observed for about two hours after injection. Mild "sedative-like" symptoms characteristic of Rausedin developed gradually for about twelve hours and persisted for about 32 hours.

This mixture of Rauwoxin and Rausedin represents one with much greater utility in treatment of hypertension when the hypotensive effect of the alkaloidal fraction of *Rauwolfia serpentina* is desired than the crude drug or any extract containing the natural ratio of the active principles present in the crude drug.

The natural content of Rauwoxin and Rausedin in the crude drug is such that one Rauwoxin unit as defined above is derived from about 4000 mg. crude drug while one Rausedin unit as defined above is derived from about one-tenth as much, or about 400 mg. crude drug. The natural ratio in the crude drug is such that properly effective hypotensive doses simultaneously provide over-dosage of Rausedin leading to cumulation and toxic actions.

By means of the present invention, that is, the discovery and separation of Rausedin and Rauwoxin, it is possible to prepare a mixture such as the one above to provide a relatively higher content of Rauwoxin and thereby enable treatment of tension states such as hypertension without greater than the desired effect from Rausedin.

An improved therapeutic agent for tension states such as hypertension derived from *Rauwolfia serpentina* should have from two to twenty, or preferably from two to ten times as high a ratio of Rauwoxin to Rausedin as that present in the crude drug.

The present invention, of course, makes possible the administration of Rauwoxin alone and substantially free of Rausedin just as it makes possible the separate administration of Rausedin substantially free from Rauwoxin.

The character and duration of action of the two agents derived from *Rauwolfia serpentina* are completely different and in some respects opposing. Therapeutic indications for their use are likewise different. Both types of action may be desirable in some circumstances such as hypertension associated with anxiety states, whereas other circumstances such as anxiety states not associated with hypertension indicate the use of Rausedin but contraindicate the use of Rauwoxin.

A further illustration of the separation of the two agents and their difference in action is provided by the accompanying kymograph tracing of an experiment on arterial blood pressure of an anesthetized white leghorn rooster. Doses of preparations prepared as in cited examples were administered intravenously. Arterial blood pressure was recorded by means of a Harvard membrane manometer suitably connected with anticoagulant solution to a cannula inserted into the popliteal artery.

Doses Nos. 7, 9 and 13 on the tracing were Rauwoxin solution free of Rausedin, prepared as in Example I, producing a definite hypotensive reaction to doses derived from 0.25 gram crude drug.

Doses 12 and 14 were Rausedin substantially free of Rauwoxin prepared as in Example II. Note the strong hypertensive effect from doses derived from 0.50 gram alcohol extracted marc.

Doses 8, 10 and 11 were a mixture of Rausedin and Rauwoxin derived as in Example III. The diphasic response is to be noted especially from dose 8. This is to be expected from the opposing character of action of the two agents as demonstrated by separate administration. This illustrates further reasons for the increased ratio of Rauwoxin to Rausedin for treating circulatory diseases such as hypertension, as compared to the natural ratio in the drug.

The chemistry of Rausedin and Rauwoxin have, of course, not yet been fully elucidated. At this time they can be differentiated and characterized as follows:

(1) Rausedin is very insoluble in organic solvents such as ether, alcohol (methyl, ethyl, etc.) and acetone.

(2) Rausedin is quite soluble in water so that it may be extracted from crude *Rauwolfia serpentina* and related species with water.

(3) Rausedin may be precipitated in various degrees of purity from aqueous solution by the addition of, for instance, alcohol or acetone to provide concentration of 25% or higher.

(4) Rausedin has a L. D. 50 in mice by intraperitoneal injection of 25 mg. per kg. or less (depending on degree of purity) with characteristic slow onset of action and long duration of effect with sedative-like symptoms (twenty-four to forty-eight hours) without acute symptoms (within two hours) of excitement, convulsion or symptoms associated with Rauwoxin effect.

(5) An aqueous solution of Rausedin at pH of 4.0 to 6.0 can be placed in a boiling water bath for two hours without marked destruction of activity (less than 50%).

(6) Rausedin is not directly hypotensive when injected intravenously in anesthetized roosters differing in this respect from the alcohol extractable Rauwoxin.

(7) Rausedin may be separated from a mixture of Rausedin and Rauwoxin by addition of solvents such as acetone or methanol in which case the Rausedin is insoluble and the Rauwoxin dissolves.

(8) Rausedin does not behave characteristically like an alkaloid in that it is not significantly extractable or soluble with organic solvents such as ether, acetone or methanol either from acid or alkaline media.

(9) Rausedin, the "sedative-like" principle from *Rauwolfia serpentina* is substantially insoluble in alcohol, acetone and the like, and is water soluble, whereas Rauwoxin is both water soluble and alcohol and acetone soluble.

(10) Rausedin produces its characteristic "sedative-like" effect after either parenteral or oral administration to mice, rabbits, cats, etc.

It is understood the component described therein was heretofore unknown and prior methods resulted in its being left in the unextracted portion with the usual alkaloidal organic solvents such as alcohol.

This component is the principle that can be controlled to produce any degree of hypotensive properties indicated in a particular instance. Surprisingly the material does not behave characteristically like an alkaloid.

While we have in this disclosure described certain embodiments of our invention in considerable detail for purposes of illustration, it will be understood that many variations therein can be made by persons skilled in the art without departing from the spirit of our invention as defined in the claims appended hereto.

We claim:

1. A process for preparing a sedative principle of *Rauwolfia serpentina* substantially free of convulsive vasodepressor activity, comprising contacting the crude drug with water, separating the resulting extract from the residue of said drug, mixing said extract with an organic solvent selected from the group consisting of acetone and alcohols containing less than 3 carbon atoms to produce an organic solvent mixture containing at least 25% by volume of said organic solvent to precipitate said sedative principle and to substantially free said sedative principle from convulsive vasodepressor activity, and separating said precipitate from the supernatant liquid.

2. The process of claim 1 in which said organic solvent is methanol.

3. A process for preparing a sedative principle of *Rauwolfia serpentina* substantially free of convulsive vasodepressor activity, comprising mixing the crude drug with an organic solvent selected from the group consisting of acetone and alcohols containing less than 3 carbon atoms, separating the resulting solvent extract from the residue of said drug, contacting said residue with water to obtain an extract of said sedative principle substantially free from convulsive vasodepressor activity, and separating said extract from said residue.

4. The process of claim 3 in which said organic solvent is methanol.

5. A process for preparing a sedative principle of *Rauwolfia serpentina* substantially free of convulsive vasodepressor activity, comprising contacting the crude drug with water, separating the resulting extract from the residue of said drug, mixing said extract with an organic solvent selected from the group consisting of acetone and alcohols containing less than 3 carbon atoms to produce an organic solvent mixture containing at least 50% by volume of said organic solvent to precipitate said sedative principle and to substantially free said sedative principle from convulsive vasodepressor activity, and separating said precipitate from the supernatant liquid.

6. In a process for preparing a sedative principle of *Rauwolfia serpentina* substantially free from convulsive vasodepressor activity, the steps of mixing the crude drug with a mixture of water and at least 50% by volume of an organic solvent selected from the group consisting of acetone and alcohols containing less than 3 carbon atoms to obtain an organic solvent extract of said crude drug, separating said organic solvent extract from the residue of said crude drug, mixing the separated residue with an aqueous solution containing not more than 50% by volume of said organic solvent to obtain an aqueous extract of said sedative principle substantially free from convulsive vasodepressor activity, and separating said aqueous extract from said residue.

7. The product obtained by the process of claim 1.

8. The product obtained by the process of claim 6.

References Cited in the file of this patent

UNITED STATES PATENTS 2,752,351    Schlittler et al.   ---------- June 26, 1956

OTHER REFERENCES

Chopra et al.: Ind. J. Med. Res., vol. 30, pp. 319–324 (1942), as abstracted in Chem. Abst., vol. 37, col. 2819 (1943).

Chopra et al.: Ind. J. Med. Res., vol. 31, pp. 71–74 (1943), as abstracted in Chem. Abstr., vol. 38, col. 5003 (1944).

Gupta et al.: Ind. J. Med. Res., vol. 32, pp. 183–8 (1944) as abstracted in Chem. Abstr., vol. 40, col. 4148 (1946).

Dutt et al.: Ind. J. Pharm., vol. 9, pp. 54–57 (1947) as abstracted in Chem. Abstr., vol. 42, col. 2729 (1948).

Schlittler et al.: Helv. Chim. Acta., vol. 33, pp. 1470–4 of art. upon pp. 1463–77 (1950).

Eckenhoff et al.: "Status Report on Analeptics," J. A. M. A., Mar. 19, 1949, pp. 780–785, esp. at page 781, col. 2, first paragraph.